Patented Jan. 2, 1940

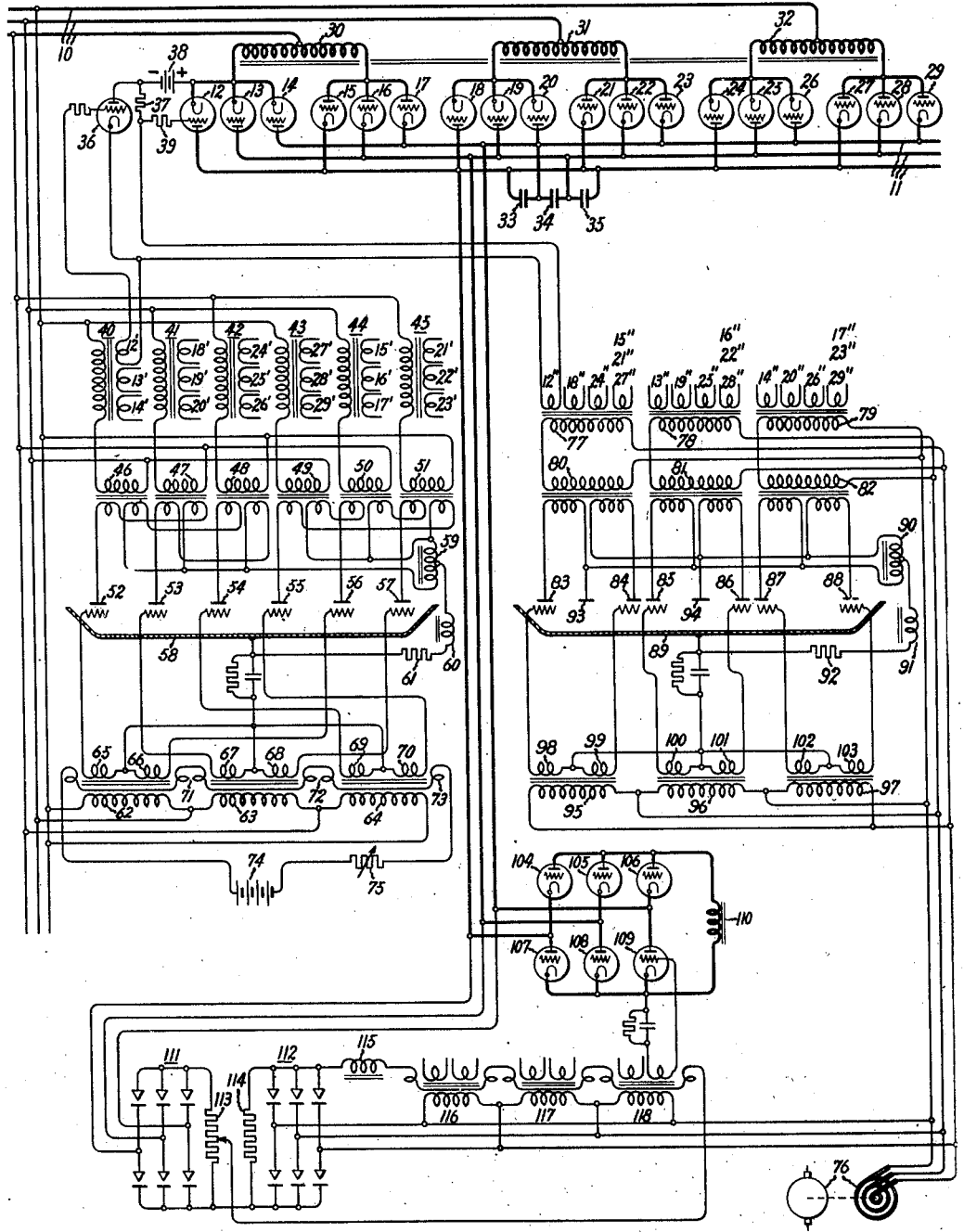

2,185,820

UNITED STATES PATENT OFFICE 2,185,820

ELECTRIC VALVE CONVERTING SYSTEM

August Schmidt, Jr., Niskayuna, N. Y., assignor to General Electric Company, a corporation of New York Application May 19, 1938, Serial No. 208,878

15 Claims. (Cl. 172—281)

My invention relates to electric valve converting systems and more particularly to such systems adapted to transmit energy between two alternating current circuits of the same or different frequencies where the ratio between the frequencies may be any desired quantity or a variable quantity.

Heretofore there have been proposed numerous electric valve converting arrangements for transmitting energy between alternating current circuits of the same or different frequencies. Where such arrangements utilize hot cathode electric valve devices it would be desirable if the control electrode or grid were at a negative potential during the latter portion of the conductivity of the valve so as to produce more reliable operation. It is furthermore well known that the regulation characteristic of such arrangements is such that the voltage varies considerably where the apparatus operates over a relatively wide range of load values.

It is an object of my invention to provide an improved electric valve converting system which will overcome the above-mentioned disadvantages of the arrangements of the prior art and which will be simple and reliable in operation.

Another object of my invention is to provide an improved electric valve converting system for transmitting energy between alternating current circuits of the same or different frequencies in which the regulation characteristic is improved by absorbing variable amounts of reactive volt amperes under certain load conditions.

It is a further object of my invention to provide an improved electric valve converting system for transmitting energy between alternating current circuits of the same or different frequencies in which hot cathode electric discharge devices are utilized and which will be more reliable in operation.

Still another object of my invention is to provide an improved system for controlling the conductivity of the valves in an electric valve converting system for transmitting energy between alternating current circuits of the same or different frequencies.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawing in which the figure represents an embodiment of my invention as applied to an electric valve converting system for transmitting energy between two alternating current circuits of the same or different frequencies.

Referring now to the drawing there is illustrated an electric valve converting system embodying my invention for transmitting energy from a three phase alternating current supply circuit 10 to a polyphase alternating current load circuit, which, by way of example, is illustrated as a three phase circuit 11. The frequency relation between these two circuits may be any desired ratio but for the purposes of explanation it will be assumed that the alternating current circuit 10 is of a lower frequency than the alternating current circuit 11. These circuits are interconnected through a plurality of groups of valves 12 to 17; 18 to 23; and 24 to 29. The cathodes of the valves 12, 13 and 14 are connected together to one terminal of an inductive winding 30 and the anodes of these valves are connected to the respective conductors of the three phase alternating current circuit 11. The anodes of the valves 15, 16 and 17 are connected to the other terminal of the inductive winding 30 and the cathodes thereof are connected to the respective conductors of the alternating current circuit 11. The cathodes of the valves 18, 19 and 20 are connected to one terminal of an inductive winding 31 and the anodes thereof are connected to the respective conductors of the alternating current circuit 11; the anodes of the valves 21, 22 and 23 are connected to the other terminal of the same inductive winding 31 and the cathodes thereof are connected to the respective conductors of the alternating current circuit 11. The cathodes of the valves 24, 25 and 26 are connected to one terminal of the inductive winding 31 and the anodes thereof are connected to the respective conductors of the alternating current circuit 11. The anodes of the valves 27, 28 and 29 are connected to the other terminal of the inductive winding 32 and the cathodes thereof are connected to the respective conductors of the alternating current circuit 11. The inductive windings 30, 31 and 32 are mounted upon a unitary core structure and the midpoints of these respective windings are connected to the respective conductors of the alternating current circuit 10. A plurality of capacitors 33, 34 and 35 may be connected in delta relation with the conductors of the alternating current circuit 11 to provide commutating potential for these various groups of valves and also to improve the resulting wave shape of the alternating current supplied to the alternating current circuit 11. A suitable control circuit is provided for controlling the conductivities of the valves 12 to 29 inclusive, and this includes an auxiliary valve for each of these valves. Such an auxiliary valve is illustrated by the valve 36, only one of which has been shown for the purpose of simplicity in disclosure and explanation. Valve 36 controls the potential appearing across a resistor 37 which is a portion of the control circuit of the main valve and which control circuit includes a suitable source of biasing potential 38 and a current limiting resistor 39.

The auxiliary valve 36 is controlled by alternating potentials which correspond to the frequency of the alternating current circuit 10 and the frequency of the alternating current circuit 11. The higher frequency of these two alternating current circuits is applied to the anode of the auxiliary valve 36 and the lower frequency is applied to the control electrode of the auxiliary valve. The control impulses supplied to the control circuit of the auxiliary valve 36 comprise substantially rectangular alternating potentials of a frequency corresponding to the frequency of the alternating current circuit 10 and are of such wave shape as to be positive for 120 electrical degrees and negative for 240 electrical degrees. This potential is supplied by a circuit which includes a plurality of control transformers 40 to 45, each of which supplies the control potentials to three auxiliary valves which valves control a group of main valves such as valves 12, 13 and 14. One of the secondary windings of the transformer 40 is shown connected to the cathode and to the control electrode of the auxiliary valve 36 through a suitable current limiting resistor. The primary winding of this transformer is connected to the alternating current circuit 10 through the primary winding of a transformer 46. Similarly, the primary windings of the transformers 41, 42, 43, 44 and 45 are each connected in series with the primary windings of transformers 47, 48, 49, 50 and 51, respectively. Each of the transformers 46 to 51 are provided with a pair of secondary windings which are connected in zigzag relation so as to energize a plurality of anodes 52 to 57 of a plurality of arc discharge devices which may have a common cathode such as cathode 58. These various secondary windings of the transformers 46 to 51 which are connected in zigzag relation are effectively arranged in two groups of star-connected windings the neutral points of which are interconnected by means of an interphase transformer 59 which is provided with a midpoint thereon which is connected through a smoothing reactor 60 and a resistor 61 to the cathode 58. Each of the anodes 52 to 57 is provided with a control electrode or grid which is energized from a control circuit including a plurality of transformers having primary windings 62, 63 and 64. The transformer having the primary winding 62 is provided with two secondary windings 65 and 66 which control respectively the grids of the anodes 52 and 56. The transformer having the primary winding 63 is provided with two secondary windings 57 and 68 which control the anodes 53 and 67, respectively. The transformer having the primary winding 64 is provided with two secondary windings 69 and 70 which control the anodes 54 and 55, respectively. The cores of the transformers having primary windings 62, 63 and 64 are each provided with auxiliary windings such as 71, 72 and 73, respectively, which are energized from a suitable source of direct current 74 through an adjustable resistor 75. These auxiliary windings serve to vary the saturation of the cores of these transformers thereby controlling the phase relation of the alternating potentials supplied by the secondary windings 65 to 70, respectively. The various electric discharge paths between the anodes 52 to 57 and the cathode 58 are rendered conductive in proper sequence by the control potential supplied by the secondary transformer windings 65 to 70 so that each of these discharge paths is conductive for 120 electrical degrees. The anode current flows through the windings of the transformers 46 to 51 which are in series with the control transformers 40 to 45, respectively, so that the alternating potential supplied by these latter transformers is a positive potential for 120 degrees and a negative potential for 240 degrees. These positive and negative potentials are substantially rectangular in form.

The alternating potential supplied to the anode of the auxiliary discharge device 36 is obtained from a circuit which includes a motor-generator set 76, the alternator of which has a frequency corresponding to the frequency desired in the alternating current output circuit 11. The alternating current derived from motor-generator set 76 is utilized to energize a plurality of control transformers 77, 78 and 79 the primary windings of which are connected in series with the primary windings of transformers 80, 81 and 82. The transformers 77, 78 and 79 respectively, are each provided with a plurality of secondary windings which supply potentials to the anodes of the auxiliary valves such as 36. Thus one of the secondary windings of the transformer 77 is shown connected to the anode-cathode circuit of the auxiliary valve 36. To show how the remaining secondary windings of the transformers 77, 78 and 79 are connected to the various auxiliary valves the secondary windings have been given double primed reference characters corresponding to the main valves which the respective auxiliary valves control. Since the auxiliary valve 36 controls the main valve 12 the corresponding winding on the transformer 77 has been indicated as winding 12″. The transformers 80, 81 and 82 are each provided with a pair of secondary windings which are arranged in two star-connected groups to supply potentials to the anodes 83 to 88 respectively, of the plurality of arc discharge devices which may have a common cathode such as 89. The neutral points of the star-connected secondary windings of the transformers 80, 81 and 82 are interconnected by an interphase transformer 90 the midpoint of which is connected through a suitable smoothing reactor 91 and a current limiting resistor 92 to the cathode 89. There is also provided a pair of zero potential anodes 93 and 94 the purpose of which will subsequently become apparent. Three control transformers 95, 96 and 97 are energized from the alternating current source 76 and each is provided with a pair of secondary windings 98, 99; 100, 101; 102, 103, respectively, which control the anodes 83, 84; 85, 86; 87, 88, respectively. The potential supplied by the secondary windings 98 to 103 respectively, render conductive in proper sequence the discharge paths between the anodes 83 to 88 and the cathode 89 so that the anode current flowing through the secondary windings of the transformers 80, 81 and 82 are such as to produce control potentials in the transformers 77, 78, 79 respectively, which are positive for 120 electrical degrees. The zero potential anodes 93 and 94 become conductive in proper order so that for the next 60 electrical degrees no potential appears across the secondary windings of the transformers 77, 78 and 79 respectively. This is followed by a negative potential which continues for 120 electrical degrees which is again followed by a zero potential period of 60 electrical degrees before the next positive potential appears. If now a suitable phase shifting device were inserted between the source of alternating potential 76 and the primary windings of the transformers 95, 96 and 97 the conductivities of the anodes 83 to 89 could be controlled so that a positive alternating potential could be made less than 120 degrees and the neutral periods increased by a corresponding amount. This would mean that the positive potentials appearing across the secondary windings of the transformers 77 to 79 respectively, would be less than 120 electrical degrees so that during the latter portions of the periods of conductivity of the main electric valves 12 to 29 the control electrodes thereof would be negative due to the effect of the biasing potential 38 thereby improving the reliability of operation of the main electric valve.

The higher frequency alternating current having rectangular positive wave shape is supplied to the anode-to-cathode circuit of the auxiliary valve such as auxiliary valve 36 and the conductivity of this valve is controlled in accordance with the lower frequency alternating potential of substantially rectangular wave form so that this lower frequency determines the time at which the auxiliary valve 36 is rendered conductive. The conductivity of the auxiliary valve 36 then controls the conductivity of the corresponding main valve such as main valve 12 because of the potential appearing across the control circuit resistor, such as resistor 37. If, however, the alternating current circuit 10 has a higher frequency than the alternating current circuit 11 the circuit supplying the control impulses for the anode circuit of the auxiliary valves would be energized from the alternating current source 10, and the circuit supplying the control impulses for the control circuit for the auxiliary valve would be energized from a suitable source of alternating current corresponding to the motor-generator set 76.

In order to provide an improvement of the regulation characteristic of the output of the electric valve converting system as connected to the alternating current circuit 11, the variable reactive load in the form of a rectifier comprising the valves 104 to 109 are effectively short circuited through an inductor 110. Each of these valves is provided with a control electrode so that the power absorbed by this rectifier which comprises a variable reactive load, may be varied in accordance with certain predetermined conditions. Upon occurrence of these predetermined conditions this variable reactive load appears to absorb reactive volt amperes thereby tending to maintain over a certain range of operation the desired regulation characteristic of the output circuit 11. The output circuit 11 is connected to a bridge rectifier 111 which is connected in opposition to a second bridge rectifier 112 which is energized from a source of constant alternating current potential such as the motor generator set 76. The voltage thus obtained from the bridge rectifier sets 111 and 112 appears across resistors 113 and 114 which are connected through a smoothing reactor 115 to the saturating windings of the control transformers 116, 117 and 118. The resistor 113 may be provided with an adjustable contact so that the proper voltage relation between the output of the bridge rectifiers 112 and 113 may be obtained. The saturation produced by the direct current flowing as a result of the output of these two bridge rectifiers serves to vary the phase relation of the alternating potential supplied by the transformers 116, 117 and 118 to the control circuit of the valves 104 to 109. The primary windings of the transformers 116 to 118 are energized from a source of potential provided by the motor generator set 76. Whenever the voltage of the alternating current circuit 11 varies above or below a predetermined amount the voltage supplied by the bridge rectifier 111 to the resistor 113 will differ from the voltage supplied by the bridge rectifier 112 to the resistor 114 to such an extent as to cause a direct current to flow through the saturating windings of the transformers 116 to 118 thereby to shift the phase of the potentials supplied to the rectifier valves 105 to 109 to cause them to absorb the proper amount of reactive volt amperes. The control circuits of the rectifier valves 104 to 109 are initially arranged so that the voltages appearing across the control electrodes are displaced 90 degrees in phase with respect to the voltage appearing across the respective anodes of these valves.

Certain features of the present system involving the use of a controlled rectifier for absorbing variable amounts of lagging reactive volt-amperes in association with an electric valve frequency changer are disclosed and being claimed in a copending patent application Serial No. 179,697 of Ernst F. W. Alexanderson, filed December 14, 1937, and which is assigned to the assignee of the present application.

While for the purposes of simplicity in illustration and explanation the valves 13 to 29 have been shown as being of the type having an anode, a cathode and a grid, it of course will be apparent to those skilled in the art that any other suitable valves may be utilized which have an anode, a cathode and a control electrode enclosed within an envelope containing an ionizable medium. Thus any suitable valves, for instance igniter valves, may be utilized. It furthermore will be apparent that while single cathode multi-anode devices have been shown for the anode-to-cathode discharge paths 52 to 57 and 83 to 88, separate electric valves of any suitable type could be utilized. It therefore will be apparent that I do not wish to be limited to the types of valves shown, since those types are merely illustrative as to how my invention may be applied.

While this invention has been shown and described in connection with the particular embodiment shown, it will, of course, be understood that it is not to be limited thereto, since it is apparent that the principles herein disclosed are susceptible of numerous other applications, and modifications may be made in the circuit arrangement and in the instrumentalities employed without departing from the spirit and scope of the invention as set forth in the appended claims.

What I claim as new and desire to secure by Letters Patent of the United States is:

1. The combination comprising a plurality of electric discharge valves interconnecting alternating current circuits of different frequencies, an auxiliary electric discharge valve including an anode, a cathode and a control electrode, for each of said first valves for controlling the conductivity thereof, a control circuit for said auxiliary valves including means for supplying to the anode thereof alternating potential having a frequency equal to one of said alternating current circuits, means for supplying to the control electrode of each of said auxiliary valves an alternating potential having a frequency equal to that of the other of said alternating current circuits, said alternating potentials each being positive for periods substantially less than 180° with reference to said alternating potentials respectively, and means for determining the duration of said periods.

2. The combination comprising alternating current input and output circuits of different frequencies, a plurality of electric valves interconnecting said circuits, an auxiliary valve for each of said first valves for controlling the conductivity thereof, said auxiliary valves each having an anode, a cathode and control electrode, means for controlling the conductivities of said auxiliary valves including two sources of alternating potential having frequencies corresponding to said input and output circuits, one of said sources being arranged to supply potential to the anode and cathode of each of said auxiliary valves, the other of said sources being arranged to supply potential to the cathode and control electrode of each of said auxiliary valves, said potentials each being positive for periods less than one half cycle of the alternating potentials appearing in said input and output circuits, and means for controlling the period of time for which potentials are positive.

3. The combination comprising an electric valve converting system interconnecting two alternating current circuits of different frequencies, said system including a plurality of groups of electric discharge valves, an auxiliary electric discharge valve for each of said first valves for controlling the conductivity thereof, means for supplying to one electrode of said auxiliary valves rectangular shaped alternating potentials having a frequency equal to one of said circuits, and means for supplying to another electrode of said auxiliary valves rectangular shaped alternating potentials having a frequency equal to the other of said circuits.

4. The combination comprising an electric valve converting system interconnecting two alternating current circuits of different frequencies, said system including a plurality of groups of electric discharge valves, an auxiliary electric discharge valve for each of said first valves for controlling the conductivity thereof, said auxiliary valves each having an anode and a control electrode, means for supplying to the anode of said auxiliary valves rectangular shaped alternating potentials having a frequency equal to the higher frequency of said circuits, and means for supplying to the control electrode of said auxiliary valves rectangular shaped alternating potentials having a frequency equal to the lower frequency of said circuit.

5. The combination comprising a plurality of groups of electric discharge valves interconnecting two alternating current circuits of different frequencies, an auxiliary electric discharge valve for each of said first valves for controlling the conductivity thereof, said auxiliary valve having an anode and a control electrode, means for supplying to the anode of said auxiliary valves rectangular shaped alternating potentials having a frequency equal to the higher one of said alternating current circuits, means for supplying to the control electrode of said auxiliary valves rectangular shaped alternating potentials having a frequency equal to the lower one of said circuits, and means for controlling the relative phase relations of said latter rectangular shaped alternating potentials thereby to control the power output of said first mentioned valve.

6. The combination comprising a plurality of groups of electric discharge valves interconnecting alternating current input and output circuits of different frequencies, an auxiliary electric discharge valve for each of said first valves for controlling the conductivity thereof, means for supplying to said auxiliary electric valves rectangular shaped alternating potentials having frequencies equal to the frequencies of said input and output circuits, means for controlling the phase relation of one of said potentials thereby to control the power output of said first mentioned valves, and means connected to said output circuit including a control rectifier for absorbing variable amounts of reactive volt amperes to control the voltage of said output circuit.

7. The combination comprising an electric valve converting system interconnecting two alternating current circuits of different frequencies, said system including a plurality of groups of electric discharge valves, an auxiliary electric discharge valve for each of said first valves for controlling the conductivity thereof, means for supplying to the anode of said auxiliary valves rectangular shaped alternating potentials having a frequency equal to the higher frequency of said circuit, means for controlling the duration of a positive portion of said rectangular shaped alternating potentials, and means for supplying to the control electrodes of said auxiliary valves rectangular shaped alternating potentials having a frequency equal to the lower frequency of said circuit.

8. The combination comprising an electric valve converting system interconnecting two alternating current circuits of different frequencies, said system including a plurality of groups of electric discharge valves, an auxiliary electric discharge valve for each of said first valves for controlling the conductivity thereof, means for supplying to the anode of said auxiliary valves rectangular shaped alternating potentials, means for determining the duration of the positive portion of said alternating potentials, means for supplying to the control electrode of said auxiliary valves rectangular shaped alternating potentials having a different frequency, and means for varying the phase relation of said latter alternating potentials to control the power output of said electric valve converting system.

9. The combination comprising an electric valve converting system interconnecting alternating current input and output circuits of different frequencies, said system including a plurality of groups of electric discharge valves, an auxiliary electric discharge valve for each of said first valves for controlling the conductivity thereof, means for supplying to the anodes of said auxiliary valves rectangular shaped alternating potentials having a frequency equal to the higher one of said circuits, means for supplying to the control electrode of said auxiliary valves rectangular shaped alternating potentials having a frequency equal to the lower one of said circuits, means for controlling the phase relation of said latter potentials thereby to control the power output of said first mentioned valves, and a control rectifier connected to said output circuit for absorbing variable amounts of reactive volt amperes thereby to control the regulation characteristic of said electric valve converting system.

10. The combination comprising an electric valve converting system interconnecting alternating current input and output circuits of different frequencies, said system including a plurality of groups of electric discharge valves, an auxiliary electric discharge valve for each of said first valves for controlling the conductivity thereof, means for supplying to the anode of said auxiliary valves rectangular shaped alternating potentials having a frequency equal to the higher one of said circuits, means for supplying to the control electrode of said auxiliary valves rectangular shaped alternating potentials having a frequency equal to the lower one of said circuits, means for controlling the phase relation of said latter potentials thereby to control the power output of said first mentioned valves, means including a rectifier connected to said output circuit, said rectifier including a plurality of electric valves each provided with a control electrode, a source of control potential for said control electrode, and means responsive to an electrical condition of said electric valve converting system for controlling the phase relation of said control potentials thereby to control the amount of lagging volt amperes absorbed by said rectifying means.

11. A system for producing substantially rectangular shaped alternating potentials comprising a source of alternating current, a pair of transformers having their primary windings connected in series across said source, an output circuit connected to the secondary winding of one of said transformers, the other of said transformers being provided with a plurality of secondary windings, an electric discharge valve connected across each of said latter windings, and means for periodically rendering conductive said valves in accordance with the frequency of said source.

12. A system for producing substantially rectangular shaped alternating potentials comprising a source of alternating current, a pair of transformers having their primary windings connected in series across said source, an output circuit connected to the secondary winding of one of said transformers, the other of said transformers being provided with a pair of secondary windings, an electric discharge valve for each of said latter windings, and being connected in shunt relation thereto, said valves each being provided with a control electrode, a source of control potential derived from said source, means for applying said control potential to said control electrodes, and means for varying the phase relation of said control potential relative to the potential of said source.

13. A system for producing substantially rectangular shaped alternating potentials having positive and negative wave portions of 120 degrees or less duration with respect to one complete cycle of said alternating potential, a source of relatively sinusoidal alternating potential, a pair of transformers having their primary windings energized in series from said source, the secondary winding of one of said transformers comprising the output circuit, a pair of secondary windings for the other of said transformers arranged to provide two end terminals and a neutral terminal, a shunt circuit for said secondary windings including a controlled electric discharge path for each end terminal and an electric discharge path for the neutral terminal, and means for controlling the conductivities of said electric discharge paths.

14. The combination in an electric valve converting system interconnecting two alternating current circuits of different frequencies comprising an electric discharge valve having an anode, a cathode and a control electrode, means for supplying to one electrode of said auxiliary valves rectangular shaped alternating potentials having a frequency equal to one of said circuits, and means for supplying to another electrode of said valve rectangular shaped alternating potentials having a frequency equal to the other of said circuits.

15. The combination in an electric valve converting system interconnecting two alternating current circuits of different frequencies comprising an electric discharge valve having an anode, a cathode and a control electrode, means for controlling the conductivity of said valve comprising means for impressing a periodic voltage of rectangular wave form on the anode of said valve, and means for impressing a periodic voltage of rectangular wave form on the control electrode of said valve.

AUGUST SCHMIDT, Jr.